（12）United States Patent
Maikawa et al.

(10) Patent No.: US 9,553,636 B2
(45) Date of Patent: Jan. 24, 2017

(54) CONTACTLESS ELECTRICITY SUPPLY DEVICE WITH FOREIGN OBJECT DETECTOR

(75) Inventors: Kengo Maikawa, Kawasaki (JP); Tomoya Imazu, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 687 days.

(21) Appl. No.: 13/822,260

(22) PCT Filed: May 23, 2012

(86) PCT No.: PCT/JP2012/063144
§ 371 (c)(1),
(2), (4) Date: Mar. 11, 2013

(87) PCT Pub. No.: WO2012/165244
PCT Pub. Date: Dec. 6, 2012

(65) Prior Publication Data
US 2013/0169062 A1    Jul. 4, 2013

(30) Foreign Application Priority Data
May 27, 2011 (JP) ................ 2011-118663

(51) Int. Cl.
*H04B 5/00* (2006.01)
*H01F 38/14* (2006.01)
(Continued)

(52) U.S. Cl.
CPC .......... *H04B 5/0037* (2013.01); *B60L 11/182* (2013.01); *H01F 38/14* (2013.01); *H02J 7/025* (2013.01);
(Continued)

(58) Field of Classification Search
CPC ...... H04B 5/0037; H04B 5/0087; H02J 17/00; H02J 7/025; H02J 2007/0096; B60L 11/182; H01F 38/14; H01F 27/36; Y02T 90/14; Y02T 90/122; Y02T 10/7005; B60M 7/00
(Continued)

(56) References Cited

U.S. PATENT DOCUMENTS 4,453,150 A * 6/1984 Messe ................ H01F 27/245
                                               336/178
5,426,363 A * 6/1995 Akagi ................. G01V 3/107
                                               324/207.17
(Continued)

FOREIGN PATENT DOCUMENTS

CN         1185867 A      6/1998
CN       101335468 A     12/2008
(Continued)

OTHER PUBLICATIONS

Japanese Office Action, Jan. 20, 2015, 3 pages.
Chinese Office Action, Aug. 4, 2014, 8 pages.

*Primary Examiner* — Jared Fureman
*Assistant Examiner* — Michael Warmflash
(74) *Attorney, Agent, or Firm* — Foley & Lardner LLP

(57) ABSTRACT

This contactless electricity supply device, which contactlessly performs charging of the battery (28) of a vehicle, is provided with: an electricity transmission coil (12) disposed at a road surface; and an electricity reception coil (22) disposed in the vehicle. A foreign object detection coil (13) is provided to the upper surface of the electricity transmission coil (12), and on the basis of induced voltage arising at the foreign object detection coil (13) during a trial electricity supply, foreign objects between the electricity transmission coil (12) and the electricity reception coil (22) are detected.

13 Claims, 13 Drawing Sheets

(51) Int. Cl.
*B60L 11/18* (2006.01)
*H02J 7/02* (2016.01)
*H02J 17/00* (2006.01)
*B60M 7/00* (2006.01)
*H01F 27/36* (2006.01)
*H02J 7/00* (2006.01)

(52) U.S. Cl.
CPC ............... *H02J 17/00* (2013.01); *B60M 7/00* (2013.01); *H01F 27/36* (2013.01); *H02J 2007/0096* (2013.01); *H04B 5/0087* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ..................................................... 307/1–104
See application file for complete search history.

(56) References Cited

U.S. PATENT DOCUMENTS

| | | | |
|---|---|---|---|
| 6,054,914 A | 4/2000 | Abel et al. | |
| 6,075,433 A | 6/2000 | Ono et al. | |
| 6,897,756 B2* | 5/2005 | Haisch | 336/130 |
| 8,378,525 B2* | 2/2013 | Yoshikawa | H02J 5/005 |
| | | | 307/104 |
| 8,680,715 B2* | 3/2014 | Tanabe | H01M 10/44 |
| | | | 307/104 |
| 8,766,487 B2* | 7/2014 | Dibben et al. | 307/104 |
| 9,281,708 B2 | 3/2016 | Wechlin et al. | |
| 2007/0228833 A1* | 10/2007 | Stevens | H02J 5/005 |
| | | | 307/45 |
| 2009/0096413 A1* | 4/2009 | Partovi et al. | 320/108 |
| 2009/0230777 A1* | 9/2009 | Baarman et al. | 307/104 |
| 2010/0109604 A1 | 5/2010 | Boys et al. | |
| 2010/0181841 A1* | 7/2010 | Azancot | H01F 38/14 |
| | | | 307/104 |
| 2010/0201315 A1 | 8/2010 | Oshimi et al. | |
| 2010/0244579 A1* | 9/2010 | Sogabe | H02J 7/025 |
| | | | 307/104 |
| 2010/0328044 A1* | 12/2010 | Waffenschmidt | H02J 7/025 |
| | | | 340/10.4 |
| 2011/0074346 A1* | 3/2011 | Hall et al. | 320/108 |
| 2011/0128015 A1* | 6/2011 | Dorairaj et al. | 324/629 |
| 2011/0270462 A1* | 11/2011 | Amano et al. | 700/297 |
| 2012/0126802 A1* | 5/2012 | Yamamoto | G01N 27/725 |
| | | | 324/239 |
| 2012/0146580 A1* | 6/2012 | Kitamura | 320/108 |
| 2012/0161535 A1* | 6/2012 | Jung et al. | 307/104 |
| 2012/0326662 A1* | 12/2012 | Matsumoto | H02J 7/025 |
| | | | 320/108 |
| 2013/0093253 A1* | 4/2013 | Norconk et al. | 307/104 |
| 2013/0303924 A1* | 11/2013 | Rosell Ferrer | A61B 5/0522 |
| | | | 600/508 |

FOREIGN PATENT DOCUMENTS

| | | | | |
|---|---|---|---|---|
| CN | 101809842 A | 8/2010 | | |
| DE | 202009009693 U1 * | 11/2010 | ............ | B60L 11/182 |
| DE | 20 2009 009 693 U1 | 12/2010 | | |
| DE | WO 2012104799 A1 * | 8/2012 | ............ | A61B 5/0522 |
| EP | 2 244 351 A2 | 10/2010 | | |
| JP | 10215530 A * | 8/1998 | | |
| JP | 11332135 A * | 11/1999 | | |
| JP | 2001-112189 A | 4/2001 | | |
| JP | 2006-230129 A | 8/2006 | | |
| JP | 2006230129 A * | 8/2006 | | |
| JP | 2008-087733 A | 4/2008 | | |
| JP | 2010-119246 A | 5/2010 | | |
| JP | 2010-530613 A | 9/2010 | | |
| JP | 2010-239848 A | 10/2010 | | |
| JP | EP 2244351 A2 * | 10/2010 | ............. | H02J 7/025 |
| JP | 2010-252624 A | 11/2010 | | |
| JP | 2010259172 A * | 11/2010 | | |
| JP | 2011-072074 A | 4/2011 | | |
| WO | WO 2011/006758 A2 | 1/2011 | | |
| WO | WO-2011/006876 A2 | 1/2011 | | |
| WO | WO 2011/036863 A1 | 3/2011 | | |

* cited by examiner

CONTACTLESS ELECTRICITY SUPPLY DEVICE WITH FOREIGN OBJECT DETECTOR

TECHNICAL FIELD

The present invention relates to a contactless electricity supply device.

BACKGROUND ART

An electricity supply system is known which includes: a power feeding means; a power receiving means for contactlessly receiving power from the power feeding means; an efficiency sensing means for sensing an efficiency of transmission between the power feeding means and the power receiving means; a determination means for determining whether or not the sensed efficiency of transmission is above a prescribed value; and a control means for determining that normal electricity supply is prevented by an obstacle, etc., in response to a condition that the sensed transmission efficiency is below the prescribed value, and temporarily suspending the power feeding of the power feeding means, and restarting power feeding by a small power a prescribed time period after the suspending (see patent document 1).

However, since the efficiency of transmission can be lowered when the power feeding coil and the power receiving coil are deviated in position from each other, it is impossible to accurately detect on a basis of change in the efficiency of transmission a foreign object coming into between the power feeding coil and the power receiving coil.

PRIOR ART DOCUMENT(S)

Patent Document(s)

Patent Document 1: JP 2010-119246 A

SUMMARY OF THE INVENTION

It is an object of the present invention to provide a contactless electricity supply device that is capable of detecting presence of a foreign object between a power feeding coil and a power receiving coil.

Means for Solving The Problem(s)

According to the present invention, a contactless electricity supply device comprises: a third coil provided at a surface of a second coil, wherein the surface faces a first coil; and a foreign object detection means that detects a foreign object between the first coil and the second coil on a basis of an induced voltage occurring in the third coil.

According to the present invention, it is possible to detect a foreign object by sensing the induced voltage of the third coil, because the foreign object causes a change in a magnetic flux passing through the third coil when the foreign object is present between the first coil and the second coil.

MODE(S) FOR CARRYING OUT THE INVENTION

The following describes embodiments of the present invention with reference to the drawings.

Figure 1:
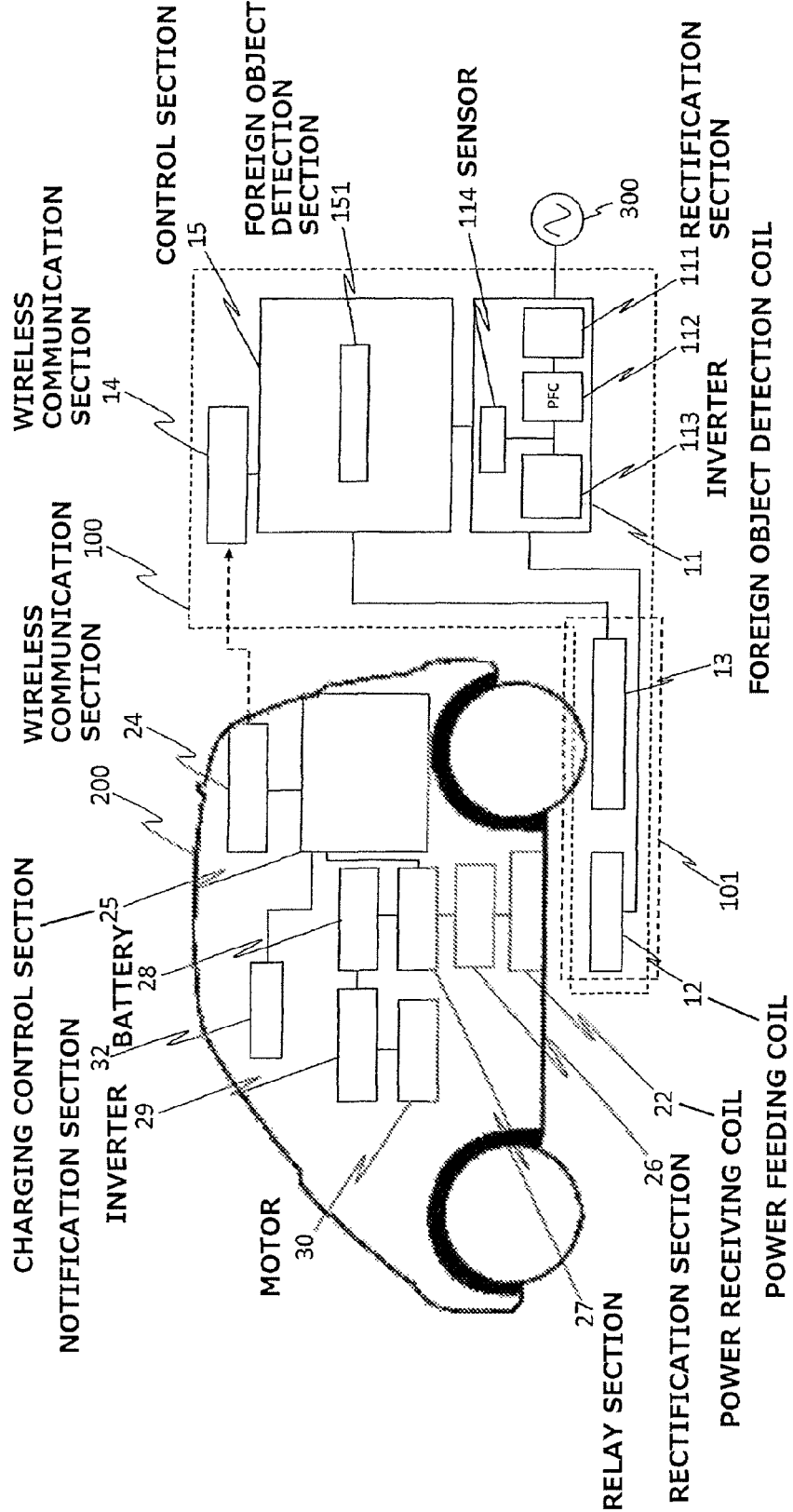
FIG. 1 is a block diagram of a contactless electricity supply system according to an embodiment of the present invention.

<First Embodiment> FIG. 1 is a block diagram of a contactless electricity supply system including a vehicle 200 and an electricity supply device 100, which includes a contactless electricity supply device according to an embodiment of the present invention. A vehicle-side unit of the contactless electricity supply device of the embodiment is mounted on an electric vehicle, but may be mounted on a hybrid electric vehicle or the like.

As shown in FIG. 1, the contactless electricity supply system of this embodiment includes vehicle 200 and electricity supply device 100, wherein vehicle 200 includes the vehicle-side unit, and electricity supply device 100 is a ground-side unit. In this system, power is supplied contactlessly from electricity supply device 100 that is provided in an electricity supply station or the like, to charge a battery 28 that is provided in vehicle 200.

Electricity supply device 100 includes a power control section 11, a power feeding coil 12, a foreign object detection coil 13, a wireless communication section 14, and a control section 15. Electricity supply device 100 is a ground-side unit that is provided at a parking space where vehicle 200 is parked, and supplies power by contactless electricity supply between coils when vehicle 200 is parked in a specified parking position.

Power control section 11 is a circuit for performing a conversion from an alternating current power send from an alternating current power source 300 to a high-frequency alternating current power, and sending same to power feeding coil 12. Power control section 11 includes a rectification section 111, a PFC (Power Factor Correction) circuit 112, an inverter 113, and a sensor 114. Rectification section 111 is a circuit that is electrically connected to alternating current power source 300, and rectifies the alternating current power outputted from the alternating current power source 300.

PFC circuit 112 is a circuit for improving the power factor by shaping the waveform outputted from rectification section 111, and is connected between rectification section 111 and inverter 113. Inverter 113 is a power conversion circuit which includes a smoothing capacitor, and a switching element such as an IGBT. Inverter 113 converts a direct current power to a high-frequency alternating current power on a basis of a switching control signal from control section 15, and supplies same to power feeding coil 12. Sensor 114 is connected between PFC circuit 112 and inverter 113, and senses the current and voltage. Power feeding coil 12 is a coil for supplying contactlessly power to a power receiving coil 22 that is provided at vehicle 200. Power feeding coil 12 is provided at a parking space where the contactless electricity supply device of this embodiment is provided.

When vehicle 200 is parked in a specified parking position, power feeding coil 12 is positioned below the power receiving coil 22 at some distance from power receiving coil 22. Power feeding coil 12 is a circular coil that is parallel to the surface of the parking space.

Foreign object detection coil 13 is a coil for detecting a foreign object present between power feeding coil 12 and power receiving coil 22. Foreign object detection coil 13 is controlled by control section 15. A power feeding unit 101 includes power feeding coil 12 and foreign object detection coil 13, and is provided on the ground of the specified parking space. When vehicle 200 is parked in the specified parking space whose position is suitable for charging by the contactless electricity supply device of this embodiment, power feeding unit 101 is positioned between the rear wheels of vehicle 200. Specific construction of power feeding unit 101 is described below.

Wireless communication section 14 performs bidirectional communication with a wireless communication section 24 that is provided at vehicle 200. Wireless communication section 14 is provided at electricity supply device 100 on the ground side. The frequency of communication between wireless communication section 14 and wireless communication section 24 is set higher than the frequency used for communication between a signal receiving section and a signal sending section, and also higher than the frequency used by a vehicle peripheral device such as an intelligent key. Accordingly, the vehicle peripheral device is unlikely to be subject to interference due to communication between wireless communication section 14 and wireless communication section 24. The communication between wireless communication section 14 and wireless communication section 24 is implemented by a wireless LAN system or the like.

Control section 15 is a section for controlling the whole of electricity supply device 100. Control section 15 includes a foreign object detection section 151, and controls power control section 11, power feeding coil 12, foreign object detection coil 13, and wireless communication section 14. Control section 15 sends to vehicle 200 a control signal indicating a start of power supply from electricity supply device 100, and receives from vehicle 200 a control signal indicating a request of receipt of power from electricity supply device 100, by communication between wireless communication section 14 and wireless communication section 24. Control section 15 performs switching control of inverter 113, and thereby controls power fed from power feeding coil 12, depending on a current sensed by sensor 114.

Vehicle 200 includes power receiving coil 22, wireless communication section 24, a charging control section 25, a rectification section 26, a relay section 27, a battery 28, an inverter 29, a motor 30, and a notification section 32. Power receiving coil 22 is provided at the bottom surface (chassis) or the like of vehicle 200, and between the rear wheels of vehicle 200. When vehicle 200 is parked in the specified parking position, power receiving coil 22 is positioned above the power feeding coil 12 at some distance from power feeding coil 12. Power receiving coil 22 is a circular coil that is parallel to the surface of the parking space.

Rectification section 26 is connected to power receiving coil 22, and is composed of a rectification circuit for rectifying to a direct current an alternating current received at power receiving coil 22. Relay section 27 includes a relay switch that is turned on and off under control of charging control section 25. When the relay switch is turned off, relay section 27 separates a higher power system including the battery 28 from a lower power system including the power receiving coil 22 and rectification section 26 which constitute a circuit section for charging.

Battery 28 is composed of a plurality of secondary cells connected to each other, and serves as a power source of vehicle 200. Inverter 29 is a control circuit such as a PWM control circuit including a switching element such as an IGBT. Inverter 29 converts to an alternating current power a direct current power outputted from battery 28, and supplies same to motor 30, depending on a switching control signal. Motor 30 is a three-phase alternating current motor or the like, and serves as a drive source for driving the vehicle 200.

Notification section 32 is composed of a warning lamp and a display or speaker of a navigation system, and outputs light, image or sound, etc., to a user, under control of charging control section 25.

Charging control section 25 is a controller for controlling the charging of battery 28. Charging control section 25 controls the signal sending section, wireless communication section 24, foreign object detection coil 13, and notification section 32, and includes a power measurement section 251. Charging control section 25 sends to control section 15 a signal indicating a start of charging, by communication between wireless communication section 24 and wireless communication section 14. Charging control section 25 is connected via a CAN communication network to a controller not shown which controls the whole of vehicle 200. This controller manages the switching control of inverter 29 and the state of charge (SOC) of battery 28. Control section 15 sends to control section 15 a signal indicating a termination of charging, depending on the SOC of battery 28, when full charging is achieved.

In the contactless electricity supply device of this embodiment, power feeding and power receipt of high-frequency power is implemented by electromagnetic induction between power feeding coil 12 and power receiving coil 22 which are out of contact with each other. In other words, when a voltage is applied to power feeding coil 12, then magnetic coupling occurs between power feeding coil 12 and power receiving coil 22, so that power is supplied from power feeding coil 12 to power receiving coil 22.

Figure 2:
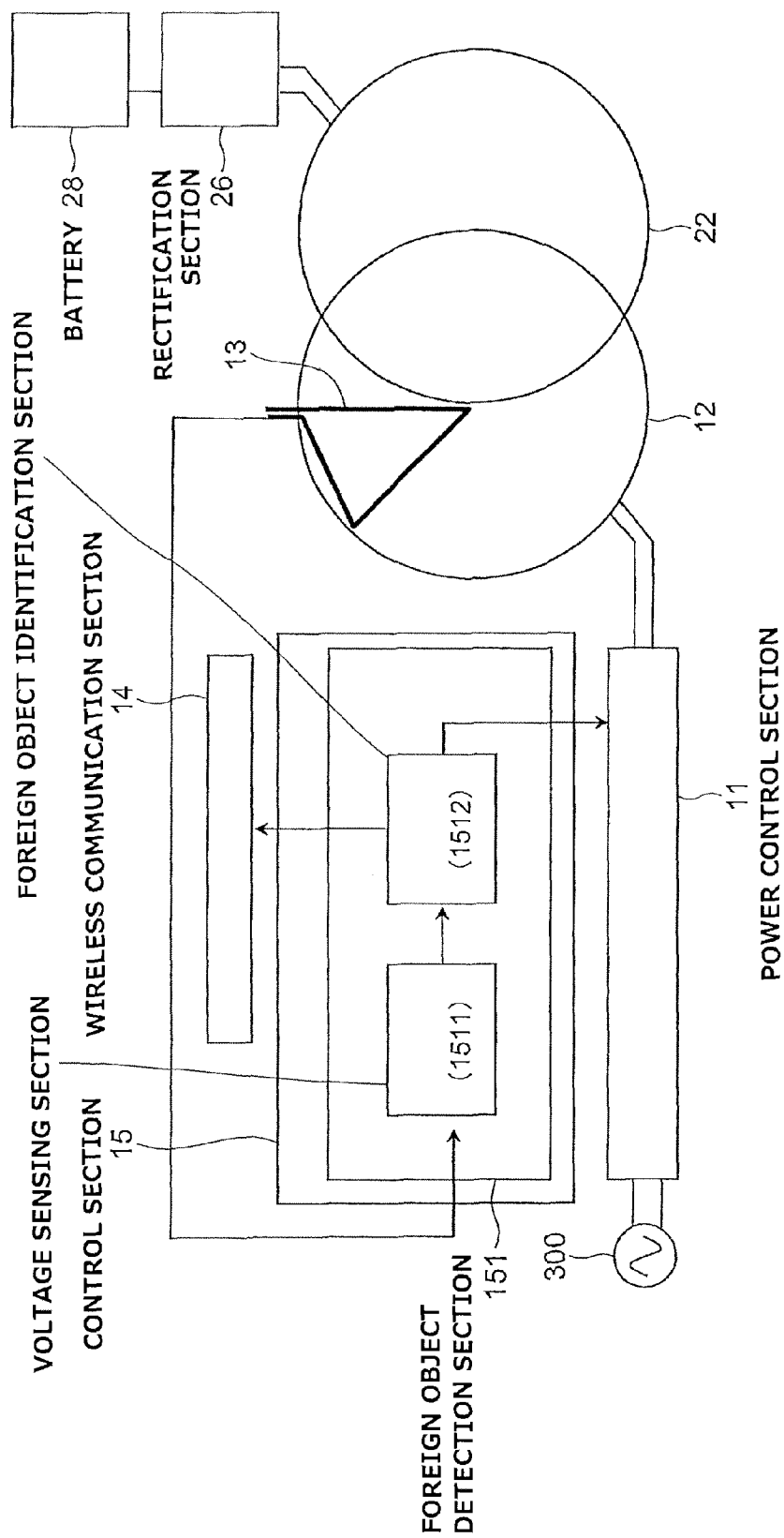
FIG. 2 is a block diagram of a part of the contactless electricity supply system of FIG. 1 which includes an electricity supply device, a power receiving coil, a rectifier, and a battery.

The following describes a configuration relating to detection of a foreign object between power feeding coil 12 and power receiving coil 22 with reference to FIG. 2. FIG. 2 is a block diagram of a part of the contactless electricity supply device of this embodiment which includes electricity supply device 100, power receiving coil 22, rectification section 26, and battery 28.

As shown in FIG. 2, foreign object detection coil 13 includes a plurality of foreign object detection coils 13. Foreign object detection coil 13 is disposed between power feeding coil 12 and power receiving coil 22, and on the surface of power feeding coil 12. In other words, the coil plane of power feeding coil 12, the coil plane of power receiving coil 22, and the coil plane of foreign object detection coil 13 are arranged to be parallel to each other, and the coil plane of foreign object detection coil 13 is included in the coil plane of power feeding coil 12.

Foreign object detection section 151 includes a voltage sensing section 1511, and a foreign object identification section 1512. Voltage sensing section 1511 is connected to foreign object detection coil 13, and senses an induced voltage occurring in foreign object detection coil 13. Voltage sensing section 1511 sends a sensed voltage to foreign object identification section 1512. Foreign object identification section 1512 compares the sensed voltage with a voltage threshold value, and thereby determines whether or not a foreign object is present between power feeding coil 12 and power receiving coil 22, and sends a result of determination to power control section 11 and wireless communication section 14. When it is determined by foreign object identification section 1512 that a foreign object is present, then control section 15 controls power control section 11 based on a control signal containing the result of determination, so as to suspend electricity supply from power feeding coil 12. If electricity supply is performed when a foreign object is present between power feeding coil 12 and power receiving coil 22, it is possible that a magnetic flux passing through the foreign object causes an eddy current to flow through the foreign object, and thereby heats the foreign object. Accordingly, in the present embodiment, electricity supply is controlled to be suspended in response to detection of a foreign object.

Moreover, in response to detection of a foreign object, control section 15 sends through wireless communication section 14 to vehicle 200 a signal indicating that a foreign object is detected. Charging control section 25 notifies the user of the presence of the foreign object by control of notification section 32 based on the signal received by wireless communication section 24. This allows the user to recognize the presence of the foreign object by notification from notification section 32.

Figure 3:
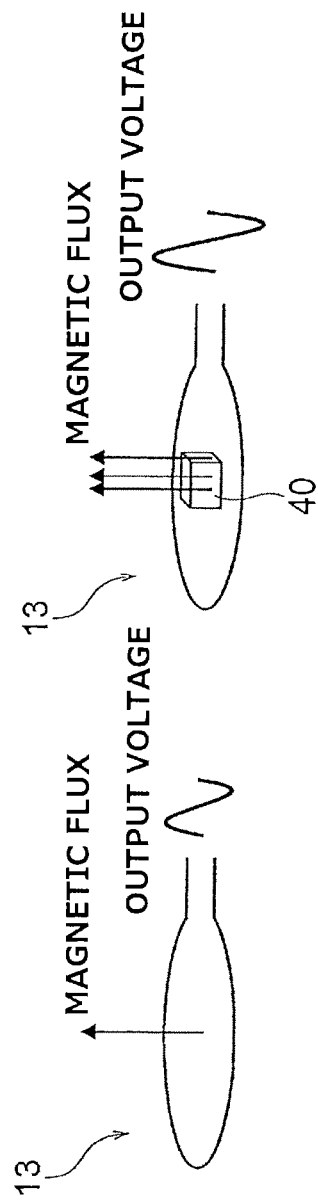
FIG. 3 is a diagram for illustrating an induced voltage occurring in a foreign object detection coil in the contactless electricity supply system of FIG. 1.

The following describes a principle for detecting a foreign object according to the present embodiment with reference to FIGS. 2 and 3. FIG. 3 is a diagram for illustrating an induced voltage generated by a magnetic flux passing through the foreign object detection coil 13.

When power is supplied from alternating current power source 300 to power feeding coil 12 through power control section 11, then power is supplied from power feeding coil 12 to power receiving coil 22 through magnetic coupling between power feeding coil 12 and power receiving coil 22. At the time of electricity supply, the magnetic flux passing through the coil plane of power feeding coil 12 and the coil plane of power receiving coil 22 also passes through the coil plane of foreign object detection coil 13. When foreign object 40 is absent on foreign object detection coil 13, an induced voltage corresponding to the magnetic flux resulting from electricity supply is outputted as an output voltage of foreign object detection coil 13 as shown in FIG. 3A. On the other hand, when foreign object 40 is present on foreign object detection coil 13, the foreign object 40 behaves as a core, to increase the magnetic flux as compared to the magnetic flux resulting from electricity supply, and thereby raise the induced voltage as shown in FIG. 3B.

A voltage threshold value for determination whether or not foreign object 40 is present is set in foreign object identification section 1512. The voltage threshold value is set higher or equal to the induced voltage occurring in foreign object detection coil 13 when foreign object 40 is absent. The voltage threshold value may be set depending on foreign object 40 as a target of detection, because the induced voltage occurring when foreign object 40 is present is proactively set during a stage of design after foreign object 40 is identified as a detection target proactively.

Foreign object identification section 1512 determines that foreign object 40 is present, in response to a condition that the sensed voltage obtained by voltage sensing section 1511 is higher than the voltage threshold value, and determines that foreign object 40 is absent, in response to a condition that the sensed voltage obtained by voltage sensing section 1511 is lower than the voltage threshold value.

Figure 4:
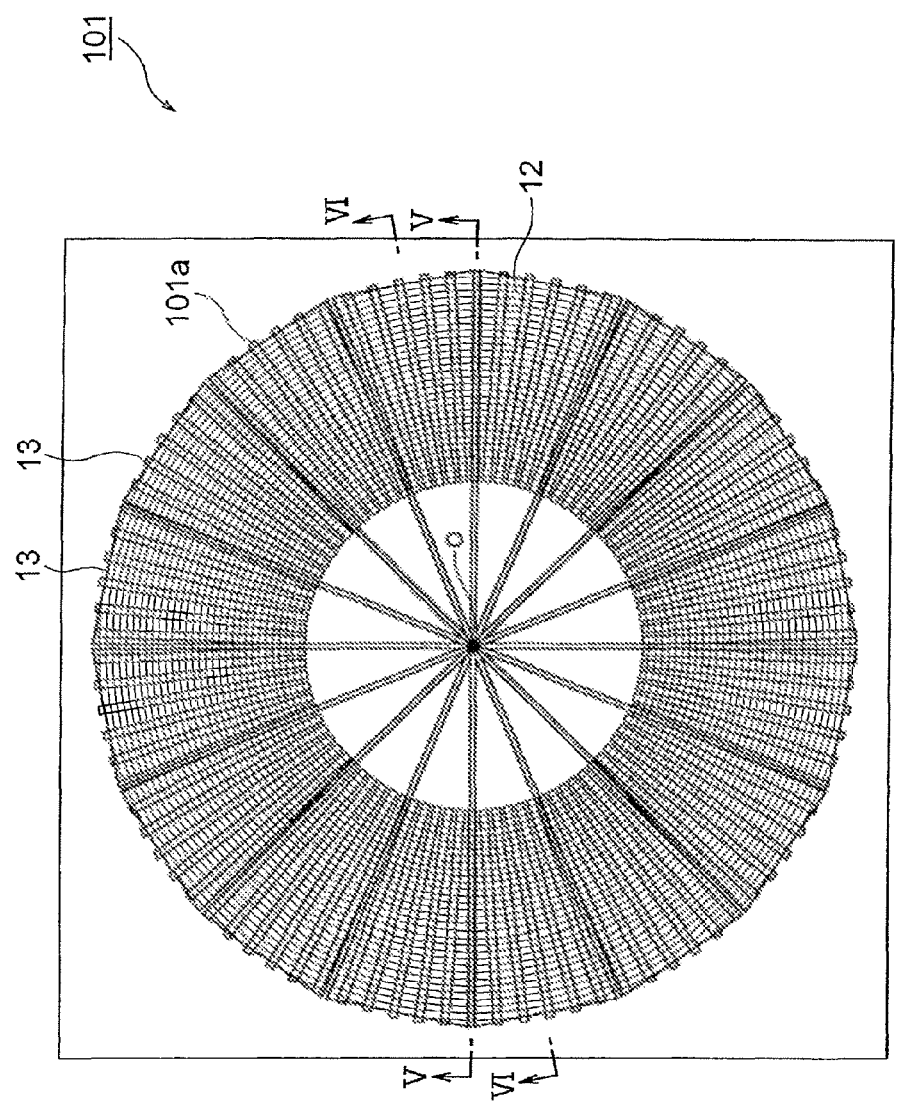
FIG. 4 is a plan view of a power feeding unit included in the contactless electricity supply system of FIG. 1.
Figure 5:
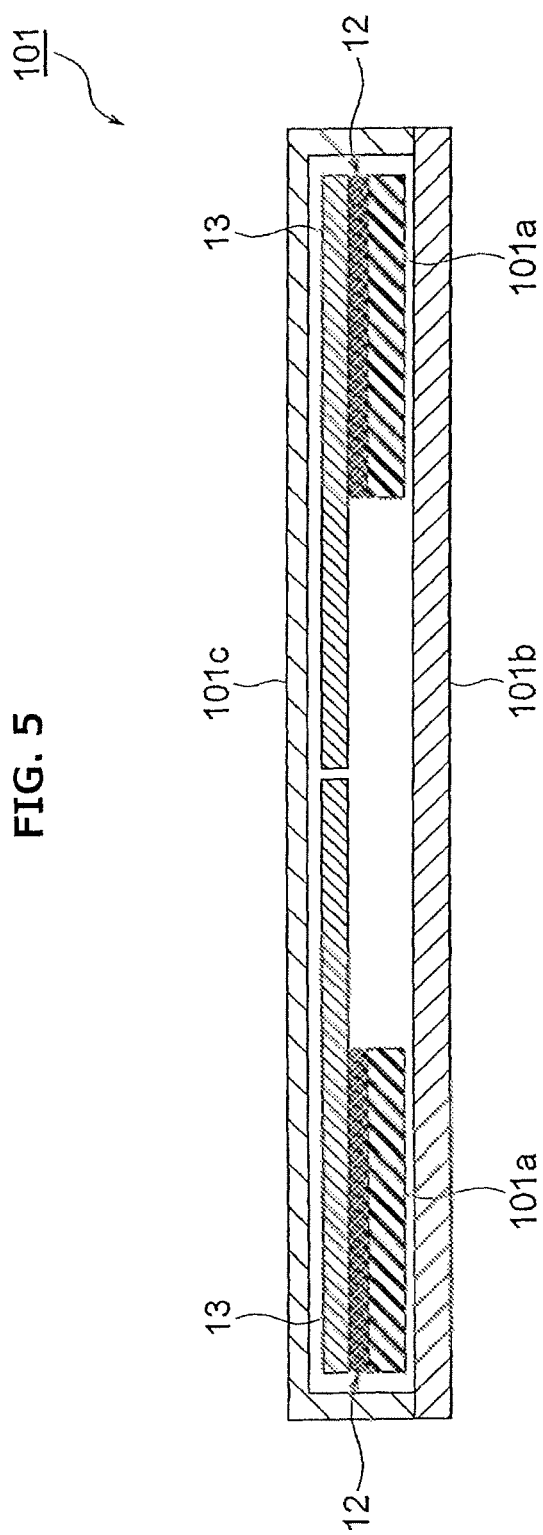
FIG. 5 is a cross-sectional view taken along the line V-V in FIG. 4.
Figure 6:
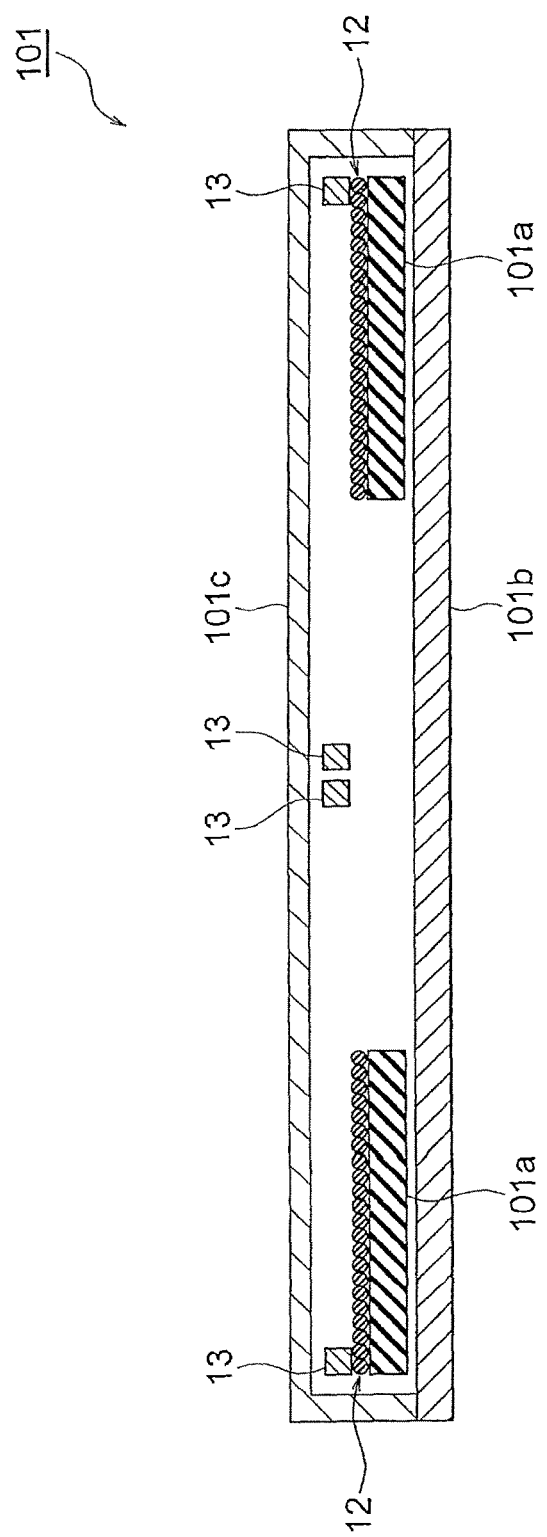
FIG. 6 is a cross-sectional view taken along the line VI-VI in FIG. 4.
Figure 7:
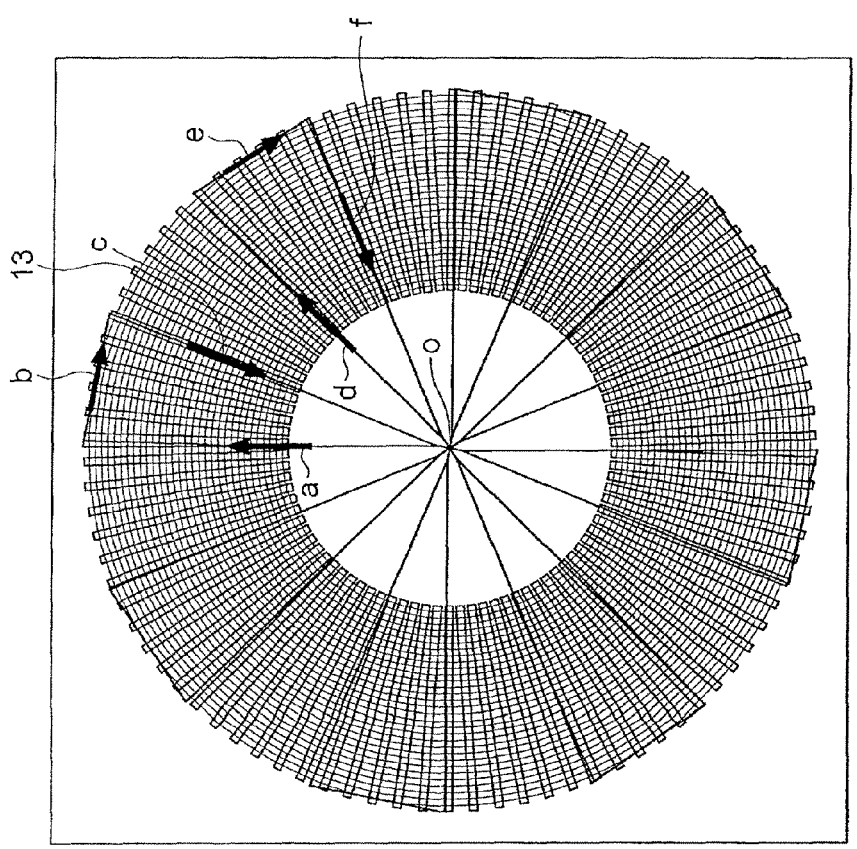
FIG. 7 is a plan view of the power feeding unit included in the contactless electricity supply system of FIG. 1.
Figure 8:
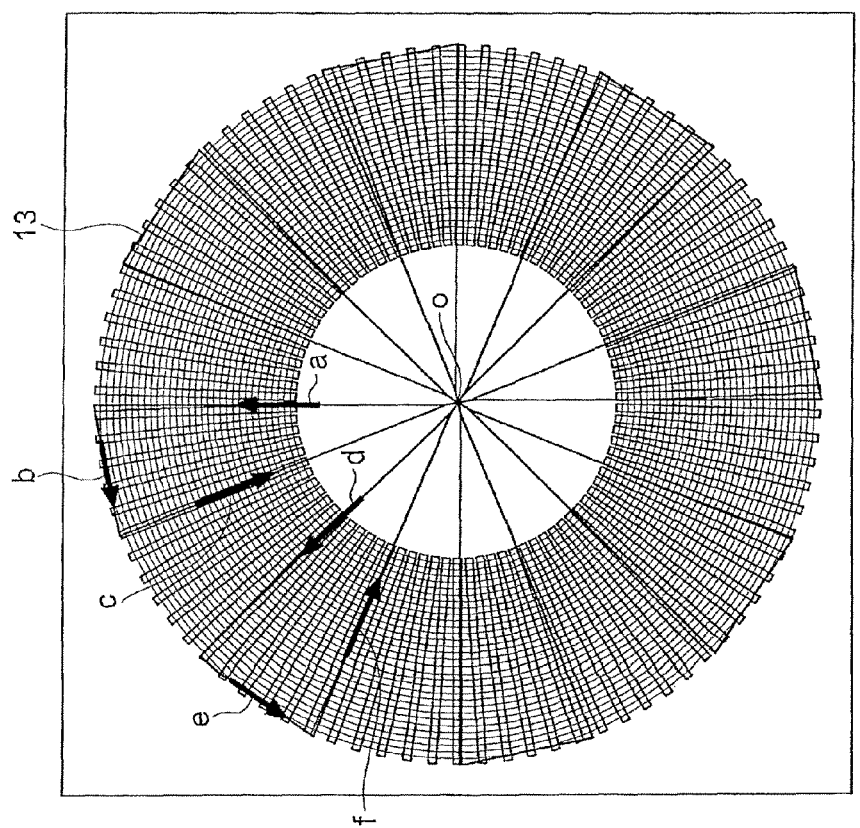
FIG. 8 is a plan view of the power feeding unit included in the contactless electricity supply system of FIG. 1.

The following describes specific configuration of power feeding unit 101 with reference to FIGS. 4-8. FIG. 4 is a plan view of power feeding unit 101. FIG. 5 is a cross-sectional view taken along the line V-V in FIG. 4. FIG. 6 is a cross-sectional view taken along the line VI-VI in FIG. 4. FIG. 7 is a plan view of power feeding unit 101 where foreign object detection coil 13 is partly omitted. FIG. 8 is a plan view of power feeding unit 101 under a condition that foreign object detection coil 13 is partly omitted. In FIGS. 4, 7 and 8, protection member 101c is omitted.

Power feeding unit 101 includes power feeding coil 12, foreign object detection coil 13, a ferrite core 101a, a magnetic shielding plate 101b, and a protection member 101c. Power feeding coil 12 is composed of a Litz wire for a high-frequency power to pass through, and is arranged so that the coil plane of power feeding coil 12 is parallel to the ground. When vehicle 200 is parked in the specified parking space, power receiving coil 22 is in a position facing the power feeding coil 12, so that power feeding coil 12 and power receiving coil 22 face each other. In other words, the upper surface of power feeding coil 12 is a surface facing the power receiving coil 22, whereas the lower surface of power receiving coil 22 is a surface facing the power feeding coil 12.

Ferrite core 101a is composed of a plurality of magnetic members each of which has a rectangular parallelepiped shape. Ferrite core 101a is arranged at the lower surface of power feeding coil 12. Each magnetic member is arranged to extend radially from a central point of power feeding coil 12 in a direction perpendicular to the central axis of power feeding coil 12. Magnetic shielding plate 101b is provided to be parallel to the ground surface, and is positioned on the undersurface side of ferrite core 101a, and serves as a bottom surface of power feeding unit 101. Magnetic shielding plate 101b is a member for shielding a magnetic flux leaking from contactless electricity supply between power feeding coil 12 and power receiving coil 22, and preventing the magnetic flux from being leaked to the outside. Magnetic shielding plate 101b is made of an aluminum plate or the like.

Protection member 101c is an enclosure for enclosing the power feeding coil 12, ferrite core 101a, and foreign object detection coil 13, and is formed of a flat top plate, and a side wall extending from edges of the top plate in a direction perpendicular to the top plate. Protection member 101c is made of a thermoplastic resin such as polypropylene or polyamide.

Foreign object detection coil 13 is provided at a surface of power feeding coil 12 that faces the power receiving coil 22, and is arranged between the surface of power feeding coil 12 and protection member 101c. Foreign object detection coil 13 is composed of a plurality of coils, each of which is formed to have a sector shape that extends radially from the central point of power feeding coil 12 in the coil plane.

Foreign object detection coil 13 is formed by folding a coil wire in a plane parallel to the coil plane of power feeding coil 12. As shown in FIG. 7, first, the coil wire is put to extend from a central point (indicated by O in FIG. 7), which corresponds to the central point of power feeding coil 12, toward the periphery of power feeding coil 12 (as indicated by an arrow "a" in FIG. 7). Then, the coil wire is folded at the periphery of power feeding coil 12, to extend along a part of the periphery of power feeding coil 12 in the clockwise direction (as indicated by an arrow "b" in FIG. 7). Then, the coil wire is folded toward the central point O, to extend from the periphery of power feeding coil 12 to the central point O (as indicated by an arrow "c" in FIG. 7). This process forms the first coil having a sector shape. Then, the same coil wire is put to extend from the central point O toward the periphery of power feeding coil 12 (as indicated by an arrow "d" in FIG. 7). Then, the coil wire is folded at the periphery of power feeding coil 12, to extend along a part of the periphery of power feeding coil 12 in the clockwise direction (as indicated by an arrow "e" in FIG. 7). Then, the coil wire is folded toward the central point O, to extend from the periphery of power feeding coil 12 to the central point O (as indicated by an arrow "f" in FIG. 7). This process forms the second coil having a sector shape. The first coil and second coil have the same coil area, where a space is defined between the first coil and the second coil which space has the same sector shape as the first coil. Similarly, in the clockwise direction, the third or more coils are formed, and the coil wire is put to extend from the periphery of power feeding coil 12 to the central point O, thus forming the eighth coil. This process forms half of the plurality of coils of foreign object detection coil 13.

The remaining half of the coils are formed by using the same coil wire shown in FIG. 7, as shown in FIG. 8. Namely, the coil wire is put to extend from the central point toward the periphery of power feeding coil 12 (as indicated by an arrow "a" in FIG. 8). Then, the coil wire is folded at the periphery of power feeding coil 12, to extend along a part of the periphery of power feeding coil 12 in the counterclockwise direction (as indicated by an arrow "b" in FIG. 8). Then, the coil wire is folded toward the central point O, to extend from the periphery of power feeding coil 12 to the central point O (as indicated by an arrow "c" in FIG. 8). This process forms the first coil having a sector shape. Then, the same coil wire is put to extend from the central point O toward the periphery of power feeding coil 12 (as indicated by an arrow "d" in FIG. 8). Then, the coil wire is folded at the periphery of power feeding coil 12, to extend along a part of the periphery of power feeding coil 12 in the counterclockwise direction (as indicated by an arrow "e" in FIG. 8). Then, the coil wire is folded toward the central point O, to extend from the periphery of power feeding coil 12 to the central point O (as indicated by an arrow "f" in FIG. 8). This process forms the second coil having a sector shape. The first coil and second coil have the same coil area, where one of the plurality of coils shown in FIG. 7 is arranged between the first coil and the second coil.

In this way, foreign object detection coil 13 is composed of a plurality of coils which are connected to each other by a single coil wire, wherein each coil has the same coil area. The coil plane of power feeding coil 12 is covered by the coil planes of the plurality of coils constituting the foreign object detection coil 13.

The first and second ends of foreign object detection coil 13 are connected to terminals (not shown), and are connected through the terminals to a circuit board (not shown) in power feeding unit 101.

The following describes a control performed by control section 15 and charging control section 25.

Control section 15 performs a system check as an initialization control, determining whether or not systems of electricity supply device 100 operate normally. Similarly, charging control section 25 performs a system check as an initialization control, determining whether or not a charging system of vehicle 200 operates normally. When the result of the system check indicates that a system abnormality is present in vehicle 200, control section 15 informs the user. When the result of the system check indicates that a system abnormality is present in electricity supply device 100, control section 15 notifies a center or the like that is managing the electricity supply device 100. On the other hand, when the system check is normal, control section 15 starts up the wireless communication section 14, and thereby establishes a condition where a signal can be received. For example, the system check for electricity supply device 100 is performed at intervals of a specified period, whereas the system check for vehicle 200 is performed when a main switch is turned on wherein the main switch serves to drive vehicle 200.

Control section 15 and charging control section 25 control wireless communication section 14 and wireless communication section 24, respectively, by the following remote communication control. First, charging control section 25 obtains information about present position of vehicle 200 by a GPS function provided in vehicle 200, and determines whether or not the present position of vehicle 200 is within a predetermined charging spot. The charging spot is set individually for electricity supply device 100, and is, for example, a region that is displayed on a map as a circle having a center at the position of electricity supply device 100. The condition that vehicle 200 is within the charging spot means that charging of battery 28 will be implemented by electricity supply device 100 corresponding to the charging spot.

When the present position of vehicle 200 is within the charging spot, charging control section 25 starts up the wireless communication section 24, and thereby allows communication between wireless communication section 14 and wireless communication section 24. When communication is allowed between wireless communication section 14 and wireless communication section 24, then charging control section 25 sends from wireless communication section 24 to wireless communication section 14 a signal for establishing a data link. Then, control section 15 sends back from wireless communication section 14 to wireless communication section 24 a signal indicates that control section 15 has received the signal. This process establishes the data link between wireless communication section 14 and wireless communication section 24.

Moreover, charging control section 25 sends an ID of vehicle 200 to control section 15 through communication between wireless communication section 14 and wireless communication section 24. Control section 15 performs ID authentication by determining whether or not the ID sent from vehicle 200 coincides with one of the registered IDs. In this contactless electricity supply system, chargeable vehicles 200 are proactively registered by ID in each electricity supply device 100. Accordingly, vehicle 200 can be supplied with electricity when the ID authentication indicates that the ID of vehicle 200 coincides with a registered ID.

When vehicle 200 is parked in the specified parking space, power receiving coil 22 is positioned in the position facing the power feeding coil 12. When the user performs an operation for charging the battery 28, then charging control section 25 sends from wireless communication section 24 to electricity supply device 100 a signal indicating a start of electricity supply. When control section 15 has received the signal from wireless communication section 14, then control section 15 controls power control section 11, to start electricity supply from power feeding coil 12 to power receiving coil 22.

Control section 15 performs a trial electricity supply before a normal electricity supply for charging the battery 28. The power for sending electricity in the trial electricity supply is lower than that in the normal electricity supply. Foreign object detection section 151 senses the output voltage of foreign object detection coil 13 by voltage sensing section 1511, and compares the sensed voltage with the threshold voltage value to determine whether or not a foreign object is present by foreign object identification section 1512. When the presence of a foreign object is detected during the trial electricity supply, control section 15 sends from wireless communication section 14 to vehicle 200 a signal indicating the detection of the presence of the foreign object, without performing the normal electricity supply. In response to the signal, charging control section 25 controls notification section 32 to make a notification that a foreign object is present between the coils. This process allows to detect the presence of a foreign object before the normal electricity supply, and suppress heating of the foreign object.

On the other hand, when the presence of no foreign object is detected during the trial electricity supply, control section 15 controls power control section 11 to perform normal electricity supply. Charging control section 25 charges battery 28 by supplying to battery 28 a power received at power receiving coil 22 during the normal electricity supply.

Foreign object detection section 151 senses the output voltage of foreign object detection coil 13 by voltage sensing section 1511 and determines by foreign object identification section 1512 whether or not a foreign object is present, also during the normal electricity supply. When the presence of a foreign object is detected during the normal electricity supply, control section 15 suspends the normal electricity, and sends to vehicle 200 a signal indicating that the foreign object is present. In response to the signal, charging control section 25 suspends the charging of battery 28 and controls notification section 32 to make a notification that a foreign object is trapped. This process allows to detect the presence of a foreign object also during the normal electricity supply, and suppress heating of the foreign object.

As described above, in the present embodiment, foreign object detection coil 13 is provided at the surface of power feeding coil 12 facing the power receiving coil 22, and foreign object detection section 151 detects a foreign object between power feeding coil 12 and foreign object detection coil 13, based the induced voltage occurring in foreign object detection coil 13. When the foreign object is small, it is difficult to detect the foreign object based on electricity supply efficiency because the amount of change of electricity supply efficiency is small. However, since the foreign object detection is based on the induced voltage in this embodiment, it is possible to detect the foreign object even when the foreign object is small, and it is possible to enhance the accuracy of detection as compared to the foreign object detection based on electricity supply efficiency.

In the present embodiment, foreign object detection coil 13 is composed of a plurality of coils. This causes that the ratio of the foreign object in the coil area of each of the plurality of coils is relatively large, and the change of the induced voltage with respect to magnetic flux change is relatively large, and thereby allows to enhance the accuracy of foreign object detection.

Moreover, the coil plane of power feeding coil 12 is divided by the plurality of coils of foreign object detection coil 13. This results in segmenting the region corresponding to the coil plane of power feeding coil 12 (region where electricity supply may be prevented by the presence of a foreign object) into unit areas for foreign object detection, and thereby the change of the induced voltage with respect to magnetic flux change, and thereby allows to enhance the accuracy of foreign object detection.

Moreover, foreign object detection coil 13 is connected by a single coil wire. Accordingly, it is sufficient to provide only one input/output terminal connected to foreign object detection coil 13.

Figure 9:
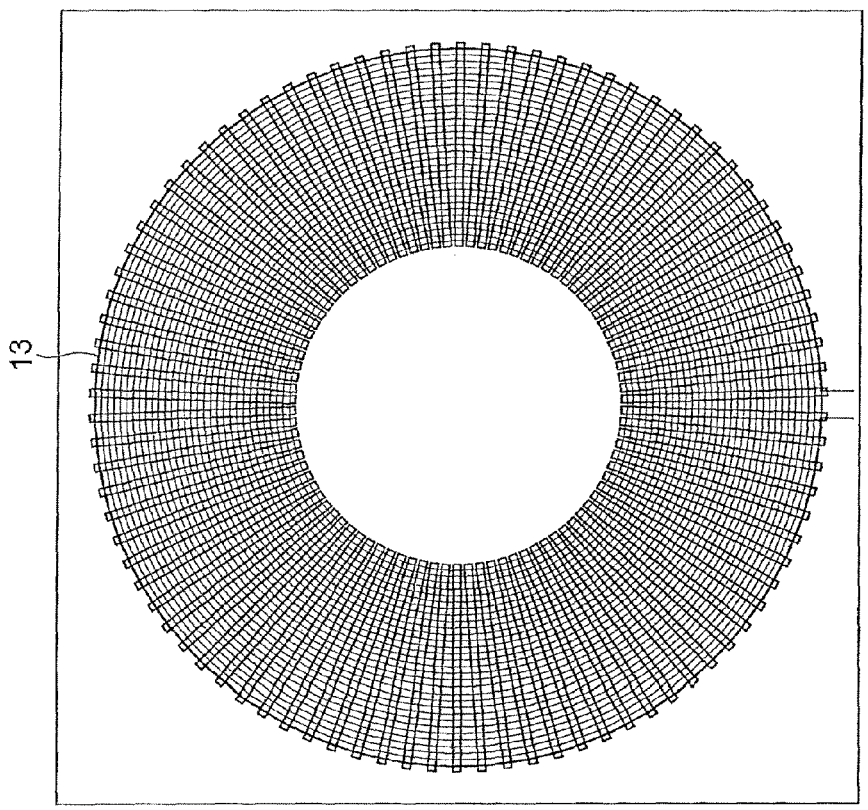
FIG. 9 is a plan view of a power feeding unit included in a contactless electricity supply system according to a modification of the present invention.

In this embodiment, foreign object detection coil 13 is composed of a plurality of coils each of which has a sector shape. However, it is unnecessary to employ the sector shape, but it is optional to employ a circular coil parallel to the coil plane of power feeding coil 12, as shown in FIG. 9. FIG. 9 is a plan view of electricity supply device 100 of a contactless electricity supply device according to a modification.

Moreover, it is unnecessary that foreign object detection coil 13 covers the coil plane of power feeding coil 12, but it is sufficient that at least a part of the coil plane of power feeding coil 12 overlaps with a part of foreign object detection coil 13. It is unnecessary that foreign object detection coil 13 is provided at the surface of power feeding coil 12 facing the power receiving coil 22, but foreign object detection coil 13 may be provided at the surface of power receiving coil 22 facing the power feeding coil 12, or may be provided at vehicle 200. Although foreign object detection section 151 is provided in control section 15, foreign object detection section 151 may be provided in charging control section 25.

One of power feeding coil 12 and power receiving coil 22 corresponds to a first coil of the present invention, and the other coil corresponds to a second coil of the present invention, and foreign object detection coil 13 corresponds to a third coil of the present invention, and foreign object detection section 151 corresponds to a foreign object detection means of the present invention.

Figure 10:
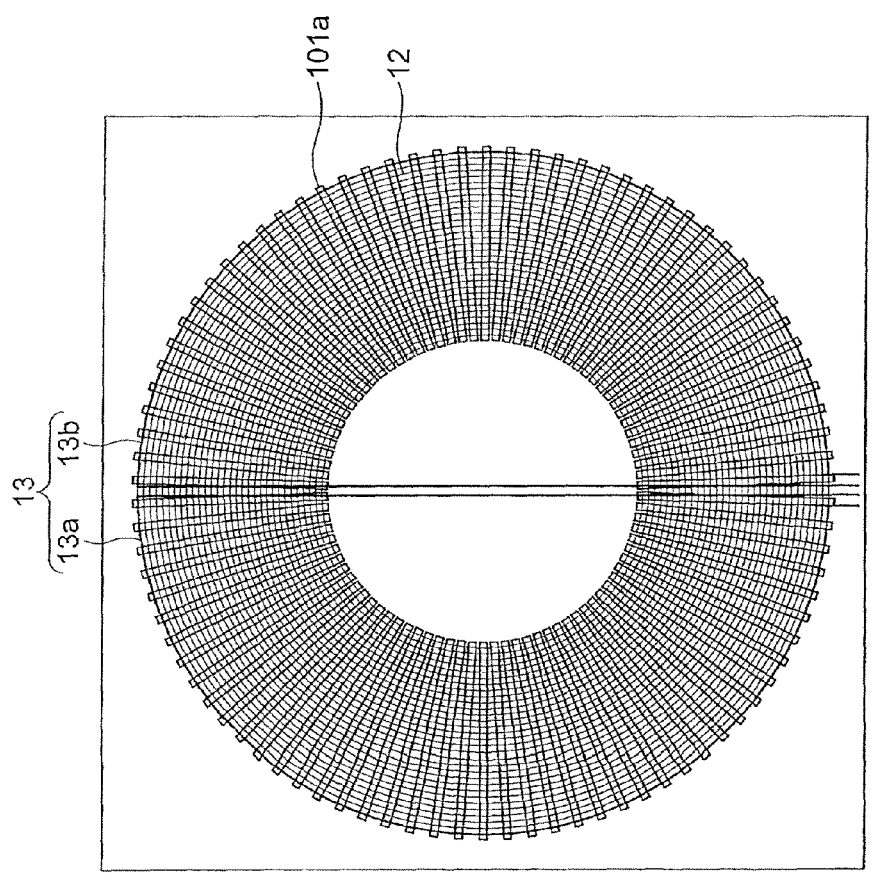
FIG. 10 is a plan view of a power feeding unit included in a contactless electricity supply system according to another embodiment of the present invention.

<Second Embodiment> The following describes a contactless electricity supply device according to another embodiment of the present invention with reference to FIG. 10. This embodiment differs from the first embodiment described above in that foreign object detection coil 13 is composed of a plurality of independent coils. With regard to the same part of the remaining configuration as in the first embodiment, the description for the first embodiment is applied as appropriate. FIG. 10 is a plan view of power feeding unit 101 included in the contactless electricity supply device of this embodiment. In FIG. 10, protection member 101c is omitted.

Foreign object detection coil 13 is composed of a semicircular coil 13a and a semicircular coil 13b on the coil plane of power feeding coil 12. Coil 13a and coil 13b are configured to be independent from each other, and have the same coil area. Input/output terminals (not shown) connected to the ends of coil 13a, and input/output terminals (not shown) connected to the ends of coil 13b, are provided independently of each other, so that coil 13a and coil 13b are connected individually to foreign object detection section 151. Accordingly, voltage sensing section 1511 senses individually the output voltage of coil 13a and the output voltage of coil 13b.

When a foreign object is present on foreign object detection coil 13a, contactless electricity supply causes the induced voltage of coil 13a to exceed a threshold voltage value for determination, and causes the induced voltage of coil 13b to become lower than the threshold voltage value. When a foreign object is present on foreign object detection coil 13b, contactless electricity supply causes the induced voltage of coil 13b to exceed the threshold voltage value, and causes the induced voltage of coil 13a to become lower than the threshold voltage value.

Foreign object identification section 1512 compares the output voltage of coil 13a and the output voltage of coil 13b with the threshold voltage value, and determines that a foreign object is present in the coil plane of the one of coil 13a and coil 13b that is outputting a higher output voltage than the threshold voltage value.

In this embodiment, the feature that independent coil 13a and coil 13b, namely coil 13a and coil 13b whose input/output terminals are independent from each other, are provided on power feeding coil 12, serves to divide the coil plane of power feeding coil 12 into a plurality of regions, and cause an induced voltage corresponding to each region, and allows to detect the place of the foreign object, namely, detect which region the foreign object is present.

Although coil 13a and coil 13b are formed to have a semicircular shape in this embodiment, it is unnecessary to employ the semicircular shape, but another shape may be employed.

Figure 11:
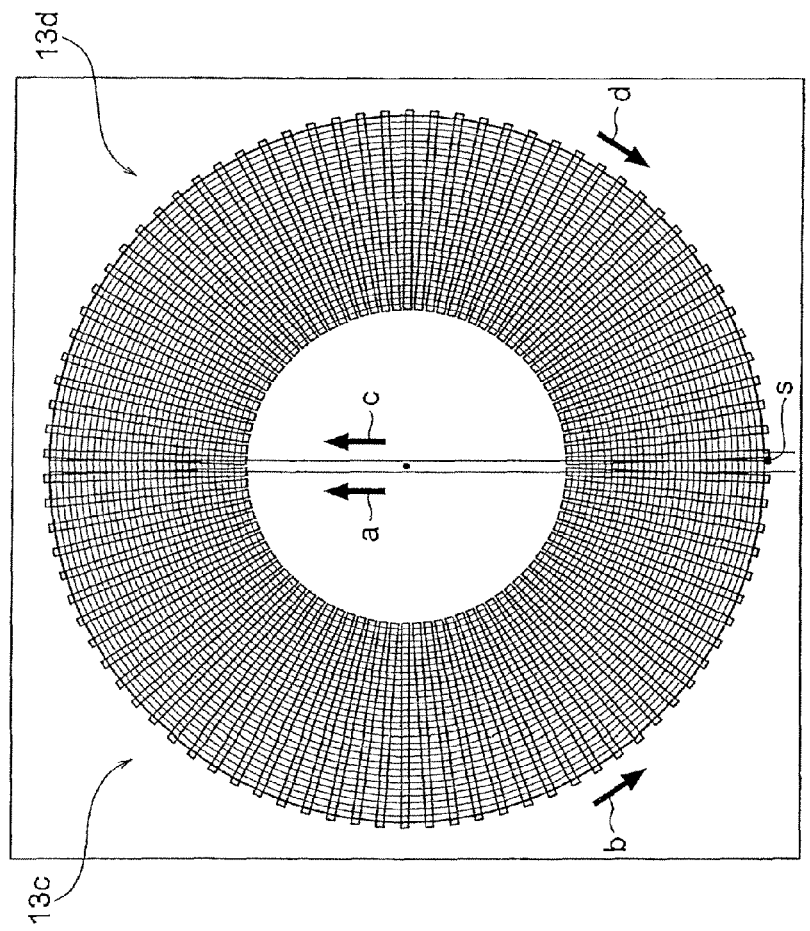
FIG. 11 is a plan view of a power feeding unit included in a contactless electricity supply system according to another embodiment of the present invention.
Figure 12:
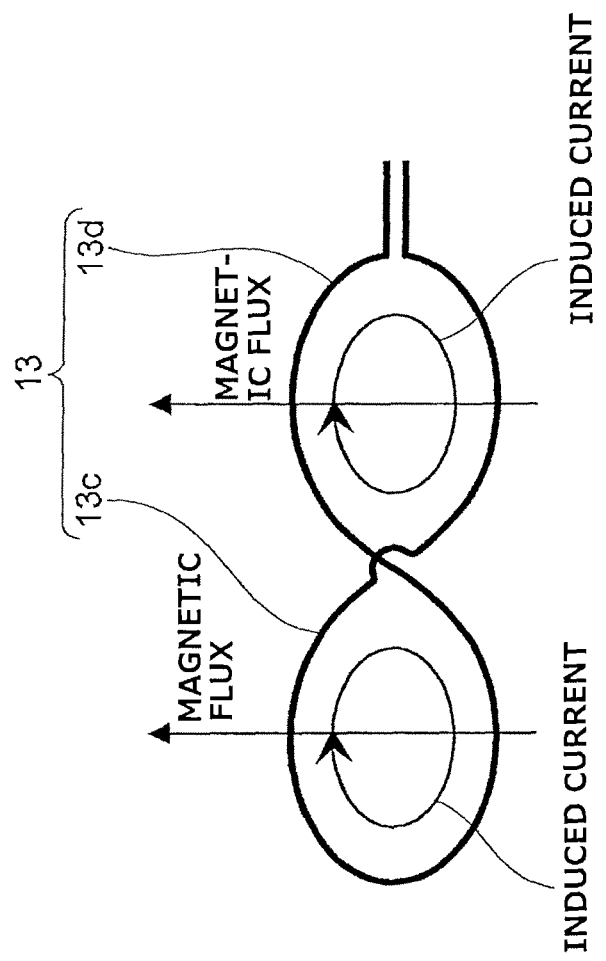
FIG. 12 is a diagram for illustrating an induced current flowing through the foreign object detection coil of FIG. 11.
Figure 13:
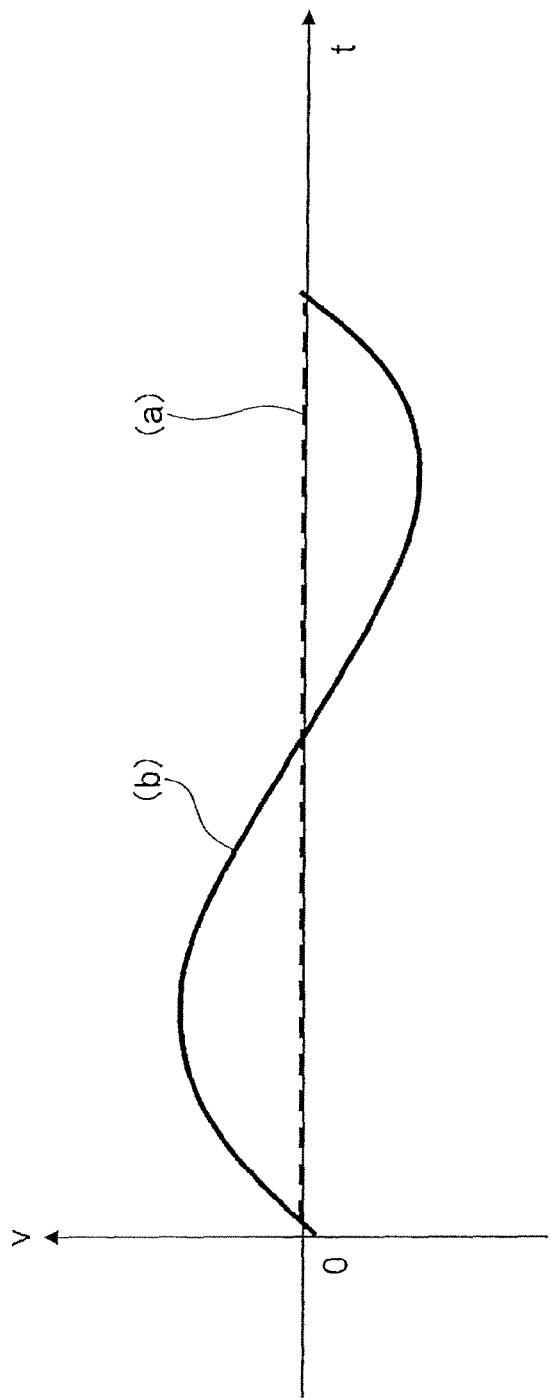
FIG. 13 is a graph showing a time characteristic of the induced voltage occurring in the foreign object detection coil.

<Third Embodiment> The following describes a contactless electricity supply device according to another embodiment of the present invention with reference to FIGS. 11-13. This embodiment differs from the first embodiment described above in that foreign object detection coil 13 is composed of a plurality of independent coils. With regard to the same part of the remaining configuration as in the first embodiment, the description for the first embodiment is applied as appropriate. FIG. 11 is a plan view of power feeding unit 101 included in the contactless electricity supply device of this embodiment. In FIG. 11, protection member 101c is omitted.

Foreign object detection coil 13 is formed by folding a coil wire in a plane parallel to the coil plane of power feeding coil 12. As shown in FIG. 11, foreign object detection coil 13 is formed by: putting a coil wire to extend along the diameter of power feeding coil 12 from a part (point S in FIG. 11) of the periphery of the coil plane of power feeding coil 12, passing on the left side of central point O (as indicated by an arrow "a" in FIG. 11); folding the coil wire at the periphery of power feeding coil 12 and putting the coil wire to extend along a semicircle of the periphery of power feeding coil 12 in the counterclockwise direction (as indicated by an arrow "b" in FIG. 11); folding the coil wire at a part (point S in FIG. 11) of the periphery of the coil plane, and putting the coil wire to extend along the diameter of the power feeding coil 12, passing on the right side of central point O (as indicated by an arrow "c" in FIG. 11); folding the coil wire at the periphery of power feeding coil 12, and putting the coil wire to extend along a semicircle of the periphery of power feeding coil 12 in the clockwise direction (as indicated by an arrow "d" in FIG. 11); and folding the coil wire to the outside of the periphery of power feeding coil 12 at a part (point S in FIG. 11) of the periphery of the coil plane.

Namely, foreign object detection coil 13 is formed of a single coil wire, including a left side coil 13c and a right side coil 13d adjacent to each other and having the same shape. The left side coil 13c and right side coil 13d are in a twisted relationship with each other, and have the same coil area.

The following describes an induced current flowing through the left side coil 13c, and an induced current flowing through the right side coil 13d, and an induced voltage of foreign object detection coil 13, with reference to FIGS. 12 and 13. FIG. 12 is a diagram for illustrating effects of foreign object detection coil 13 of this embodiment. FIG. 13 is a graph showing characteristics of the induced voltage with respect to time.

When contactless electricity supply is performed under condition that no foreign object is present on the coli plane of the left side coil 13c and the coil plane of the right side coil 13d, a magnetic flux occurs which passes through the coil plane of the left side coil 13c and the coil plane of the right side coil 13d in the same direction as shown in FIG. 12. Then, an induced voltage occurs in the left side coil 13c and the right side coil 13d as if it resists the magnetic flux. Under this condition, the induced current flowing through the left side coil 13c is in the clockwise direction, while the induced current flowing through the right side coil 13d is in the counterclockwise direction, because the left side coil 13c and the right side coil 13d are in the twisted relationship.

Since the coil area of the left side coil 13c is equal to that of the right side coil 13d, the induced current flowing through the left side coil 13c and the induced current flowing through the right side coil 13d are in directions opposite to each other so that they cancel each other, and the current thereby becomes equal to zero, and the output voltage of foreign object detection coil 13 becomes equal to zero as indicated by (a) in the graph of FIG. 13.

On the other hand, when a metal foreign object is present on one of the coil plane of the left side coil 13c and the coil plane of the right side coil 13d, the magnetic flux flowing through the one of the coils where the foreign object is present becomes more intensive so that the induced current flowing through the one of the coils where the foreign object is present becomes larger than that through the one of the coils where no foreign object is present. Since the induced current of the left side coil 13c and the induced current of the right side coil 13d do not cancel each other to zero, the output voltage of foreign object detection coil 13 becomes larger than zero as indicated by (b) in the graph of FIG. 13.

As described above, in this embodiment, foreign object detection coil 13 is composed of the plurality of coils 13c, 13d, wherein coils 13c, 13d adjacent to each other are arranged so that when no foreign object is present, the induced currents flowing through the coils are in directions opposite to each other. Accordingly, the left side coil 13c and the right side coil 13d are in the twisted relationship so that the induced currents flowing through the coils cancel each other. This makes it possible to easily detect the amount of change of the induced voltage when a foreign object is present, with respect to the induced voltage when no foreign object is present, thus improving the accuracy of detection.

In this embodiment, the coil area of the left side coil 13c and the coil area of the right side coil 13d are equal to each other. Accordingly, when no foreign object is present, the induced currents occurring in the coils cancel each other to zero, so that the output voltage of foreign object detection coil 13 becomes equal to zero. When a foreign object is present, the output voltage of foreign object detection coil 13 does not become equal to zero. Accordingly, for foreign object detection, it is sufficient to sense the amount of change of the induced voltage from zero. This enhances the accuracy of detection.

In this embodiment, the twisted relationship in foreign object detection coil 13 may be implemented by forming the foreign object detection coil 13 by a plurality of independent pairs of coils each having a sector shape as shown in FIG. 4, which are arranged to extend radially from the central point of power feeding coil 12. In this configuration, each pair of coils are formed into a twisted relationship. This causes that the plurality of coils of foreign object detection coil 13 are in the twisted relationship so that when no foreign object is present, the induced voltage becomes equal to zero. This enhances the accuracy of detection similarly as in the above configuration.

Although the twisted relationship is implemented by employing two coils in this embodiment, the number of coils may be other than two, and foreign object detection coil 13 may be configured so that a twisted relationship is formed among a plurality of coils.

The invention claimed is:

1. A contactless electricity supply device comprising:
a second coil that sends electricity to a first coil contactlessly at least through magnetic coupling therebetween;
a third coil provided at a first side of the second coil, wherein the first side faces the first coil; and
a foreign object detector that detects a foreign object between the first coil and the second coil on a basis of a change of an induced voltage occurring in the third coil, wherein the change of the induced voltage results from a change of magnetic flux between the first coil and the second coil,
wherein the third coil includes a plurality of coils,
wherein the third coil is arranged parallel to the first side of the second coil facing the first coil, and
wherein each of the plurality of coils of the third coil is sector-shaped, and arranged to extend radially from a central point of the second coil.

2. The contactless electricity supply device as claimed in claim 1, wherein at least two coils of the third coil that are adjacent to each other are arranged so that a direction of induced current flowing through one of the at least two coils is opposite to a direction of induced current flowing through another of the at least two coils when the foreign object is absent.

3. The contactless electricity supply device as claimed in claim 2, wherein the at least two coils have coil areas equal to each other.

4. The contactless electricity supply device as claimed in claim 3, wherein the foreign object detector determines that the foreign object is present, in response to a condition that the induced voltage of the third coil is nonzero.

5. The contactless electricity supply device as claimed in claim 1, wherein the plurality of coils of the third coil are connected to each other by a single wire.

6. The contactless electricity supply device as claimed in claim 1, wherein:
the foreign object detector determines whether or not the foreign object is present, by comparing the induced voltage of the third coil with a voltage threshold value for determination; and
the voltage threshold value for determination is set higher than the induced voltage of the third coil when no foreign object is present.

7. The contactless electricity supply device as claimed in claim 1, wherein:
the plurality of coils of the third coil are independent from each other; and
the foreign object detector locates the foreign object on a basis of induced voltages of the individual coils.

8. The contactless electricity supply device as claimed in claim 1, wherein:
a trial electricity supply is performed prior to a normal electricity supply; and
foreign object detection is performed during the trial electricity supply.

9. The contactless electricity supply device as claimed in claim 1, wherein:
a magnetic member is provided at a second side of the second coil, the second side being opposite to the first side of the second coil; and
the magnetic member is parted from the third coil with a distance therebetween.

10. The contactless electricity supply device as claimed in claim 9, wherein the magnetic member is a ferrite core.

11. The contactless electricity supply device as claimed in claim 1, wherein:
a magnetic member is provided at a second side of the second coil, the second side being opposite to the first side of the second coil; and
the magnetic member has a substantially flat surface facing the second coil.

12. The contactless electricity supply device as claimed in claim 11, wherein the magnetic member is a ferrite core.

13. A contactless electricity supply device comprising:
a power feeding coil that sends electricity to a power receiving coil contactlessly at least through magnetic coupling therebetween;
a foreign object detection coil provided at a first side of the power feeding coil, wherein the first side faces the power receiving coil; and
a control section that detects a foreign object between the power feeding coil and the power receiving coil on a basis of a change of an induced voltage occurring in the foreign object detection coil, wherein the change of the induced voltage results from a change of magnetic flux between the power feeding coil and the power receiving coil,
wherein the foreign object detection coil includes a plurality of coils,
wherein the foreign object detection coil is arranged parallel to the first side of the power feeding coil facing the power receiving coil, and
wherein each of the plurality of coils of the foreign object detection coil is sector-shaped, and arranged to extend radially from a central point of the power feeding coil.

* * * * *